(12) United States Patent
Lein et al.

(10) Patent No.: US 11,813,680 B2
(45) Date of Patent: Nov. 14, 2023

(54) DIAMOND TOOL AND METHOD FOR PRODUCING A DIAMOND TOOL

(71) Applicant: SCHOTT Diamantwerkzeuge GmbH, Stadtoldendorf (DE)

(72) Inventors: Burghard Lein, Kirchbrak (DE); Friedhelm Kleine, Holzminden (DE)

(73) Assignee: SCHOTT Diamantwerkzeuge GmbH, Stadtoldendorf (DE)

( * ) Notice: Subject to any disclaimer, the term of this patent is extended or adjusted under 35 U.S.C. 154(b) by 98 days.

(21) Appl. No.: 17/520,501

(22) Filed: Nov. 5, 2021

(65) Prior Publication Data
US 2022/0055127 A1 Feb. 24, 2022

Related U.S. Application Data

(62) Division of application No. 16/432,714, filed on Jun. 5, 2019, now Pat. No. 11,478,863.

(30) Foreign Application Priority Data

Jun. 7, 2018 (DE) .......................... 102018113613.7

(51) Int. Cl.
*B23C 5/10* (2006.01)
*B23P 15/34* (2006.01)

(52) U.S. Cl.
CPC ................ *B23C 5/10* (2013.01); *B23P 15/34* (2013.01); *B23C 2210/246* (2013.01); *B23C 2222/64* (2013.01); *B23C 2226/31* (2013.01)

(58) Field of Classification Search
CPC . B23C 5/10; B23C 2210/246; B23C 2222/64; B23C 2226/31; B23P 15/34
(Continued)

(56) References Cited

U.S. PATENT DOCUMENTS 3,243,924 A * 4/1966 Peters ..................... E21B 10/48
125/20
3,785,938 A * 1/1974 Sam ................... B24D 18/0018
205/110
(Continued)

FOREIGN PATENT DOCUMENTS

DE 42 29 781 A1 3/1993
DE 20 2004 018 213 U1 3/2005
(Continued)

OTHER PUBLICATIONS

German Office Action dated Feb. 16, 2019, issued in corresponding German Application No. 10 2018 113 613.7, filed Jun. 7, 2018, 7 pages.
(Continued)

*Primary Examiner* — Omar Flores Sanchez
(74) *Attorney, Agent, or Firm* — CHRISTENSEN O'CONNOR JOHNSON KINDNESS PLLC

(57) ABSTRACT

A method for producing a tool with a diamond-studded tool head includes the steps of providing a tool shank and fixing a support element to a free end of the tool shank. The method further includes the steps of applying a layer of material interspersed with diamonds at least in sections to the support element and to a section of the tool shank adjoining the support element, and at least partially removing the support element, so that the layer of material interspersed with diamonds forms a tool head which in cross-section has the form of a circular ring and has a front-side recess.

7 Claims, 3 Drawing Sheets

(58) Field of Classification Search
USPC .......................................................... 76/115
See application file for complete search history.

(56) References Cited

U.S. PATENT DOCUMENTS

| | | | | |
|---|---|---|---|---|
| 5,031,484 | A | * | 7/1991 | Packer .................... B23P 15/34 |
| | | | | 407/119 |
| 5,285,598 | A | * | 2/1994 | Arita ...................... B28D 1/041 |
| | | | | 408/1 R |
| 11,478,863 | B2 | * | 10/2022 | Lein ................... B24D 18/0018 |
| 2006/0251482 | A1 | * | 11/2006 | Miyanaga ................ B24D 7/18 |
| | | | | 408/204 |
| 2013/0022421 | A1 | * | 1/2013 | Markwald ............... E21B 10/02 |
| | | | | 408/145 |
| 2015/0306685 | A1 | * | 10/2015 | Rakes ...................... B23C 5/16 |
| | | | | 407/53 |
| 2016/0052108 | A1 | * | 2/2016 | Miess ...................... B23C 5/10 |
| | | | | 51/307 |
| 2022/0161335 | A1 | * | 5/2022 | Koshiyama ............... B23C 5/10 |

FOREIGN PATENT DOCUMENTS

| | | |
|---|---|---|
| DE | 10 2005 026 474 A1 | 12/2006 |
| EP | 0 009 371 B1 | 7/1982 |
| GB | 1 499 992 | 2/1978 |
| GB | 2 259 264 A | 3/1993 |
| JP | 3-208510 A | 9/1991 |
| WO | 2017/147035 A1 | 8/2017 |

OTHER PUBLICATIONS

EP Office Action dated Oct. 17, 2019, issued in European Application No. 19177831.5, filed Jun. 30, 2019, 9 pages.

European Examination Report with partial translation dated Jul. 23, 2021, issued in corresponding Application No. EP 19177831, filed Jun. 3, 2019, 7 pages.

* cited by examiner

DIAMOND TOOL AND METHOD FOR PRODUCING A DIAMOND TOOL

CROSS-REFERENCE TO RELATED APPLICATION

This application is a divisional application of pending U.S. patent application Ser. No. 16/432,714 filed Jun. 5, 2021, which claims the benefit of German Application Number DE 10 2018 113 613.7, filed Jun. 7, 2018, the disclosures of which are hereby incorporated by reference.

FIELD

The invention relates to a diamond tool and a method for producing a diamond tool.

BACKGROUND

Diamond tools are generally known. In particular, diamond milling cutters designed as hollow milling cutters are known, which have a tool head with a recess on the front side, said recess being delimited on the circumferential side by a tool head section that has the form of an annular ring.

The tool heads are often electroplated tool heads in which a layer of a metal interspersed with diamonds, in particular nickel interspersed with diamonds, is applied to a support. In order to connect such a tool head with a tool shank consisting of cemented carbide, two soldering points are required: a brazing solder point, by means of which a steel body is fixed to the tool shank, and a soft solder point, by means of which the tool head, studded with diamonds by electroplating, is fixed to the steel body.

On the one hand, such a production is complex and, on the other hand, it is mechanically susceptible to damage due to the two solder points. Furthermore, the material properties of the cemented carbide of the tool shank can be adversely affected due to the thermal stress that occurs during brazing, as a result of which the tool shank becomes brittle and/or shows surface cracks.

SUMMARY

An embodiment of the present disclosure provides a diamond tool which is, on the one hand, easy to manufacture and less susceptible to damage from physical processes and, on the other hand, has high mechanical stability.

According to a first aspect, a diamond tool is designed in particular for processing brittle materials, in particular glass, by means of machine tools. The diamond tool comprises a tool shank, in particular a cemented carbide tool shank, and a tool head which is fixed on the tool shank and which is formed by a layer of material interspersed with diamonds at least in sections. In particular, a front section of the tool head can be interspersed with diamonds and a rear section of the tool head, used to fix the tool head to the tool shank, can have no diamonds. The layer of material interspersed with diamonds at least in sections is directly integrally bonded to the tool shank, i.e. extends at least in sections on the tool shank in order to produce an integral bond therewith. The integral bond can be achieved in particular in that the layer of material is grown by electroplating at least in sections on the tool shank. As a result, the tool head is fixed on the tool shank without a soldering joint. The tool head has a recess on the front side so that, in cross-section, the tool head is formed as a circular ring in the area of the free end.

The technical advantage of the diamond tool is that the direct integral bond of the tool head to the tool shank creates a mechanically highly resilient diamond tool that is easy to manufacture and has high passive vibration damping and comparatively high concentricity. The recess at the front side allows the diamond tool to be immersed in the material to be processed in the axial direction since, as a result of the front-side circular ring form of the tool head, no stationary tool head area or an only slightly moving tool head area engages with the material to be processed.

According to one embodiment, the tool head forms a hollow milling cutter. A free end-side section of the tool head is designed as a blind hole (apart from a possibly existing axial bore for the supply of cooling fluid). The blind hole-like section of the tool head consists entirely of a nickel-diamond material grown by electroplating and forms the section of the tool head by means of which the material is processed (e.g. drilling or milling). The bottom of the blind hole-like tool head is preferably formed by the tool shank.

According to one embodiment, the tool head protrudes at least in sections from the tool shank on the free end-side. In particular, a first section of the tool head provides a direct, integral bond of the tool head to the tool shank, and a second section of the tool head, which projects from the tool shank on the free end-side, forms a tool section, by means of which the material is processed and which is interspersed with diamonds. This results in a flexibly usable, mechanically very stable diamond tool.

According to one embodiment, the layer of material interspersed with diamonds at least in sections is a nickel layer containing diamonds or a layer of material containing at least a proportion of nickel. The use of a nickel layer interspersed with diamonds is advantageous since it has a high mechanical strength and is therefore very well suited to process brittle materials, such as glass.

According to one embodiment, the layer of material interspersed with diamonds at least in sections is a layer of material applied by an electroplating process. For example, the tool head provided on the tool shank consists entirely of a material grown by electroplating, in particular a material containing at least a large proportion of nickel, in which diamond grains were introduced at least in sections during the electroplating process. This makes it possible to achieve a tool head with a high mechanical load-bearing capacity, which is also connected to the tool shank directly and immediately, i.e. without using an element that is soldered e.g. to the tool shank, with a high mechanical stability via a section of the tool head produced by electroplating.

According to one embodiment, the tool shank has a circumferential contouring to which the tool head is integrally bonded at least in sections. The circumferential contouring can here run around the circumference of the tool shank or only be partially provided on the tool shank. The circumferential contouring allows a tight fit to be achieved between the tool shank and the tool head, which additionally increases the mechanical stability of the diamond tool. In particular, the circumferential contouring can effectively prevent twisting of the tool head relative to the tool shank and/or axial removal of the tool head from the tool shank.

According to one embodiment, the tool shank has a rotationally asymmetrical area in a front section, to which the tool head is integrally bonded at least in sections. The term "front section" here refers to a section of the tool shank which is located in the immediate vicinity of the tool head and which is covered at least in sections by the layer of material forming the tool head. "Rotationally asymmetrical"

refers to an area that is not rotationally symmetrical with respect to the longitudinal axis of the tool shank, which is also the axis of rotation of the diamond tool. The rotational asymmetry can be achieved by any contouring, for example by notches running axially or obliquely to the longitudinal axis or by a polygonal cross-section (for example triangular, square, hexagonal or polygonal) of the front section of the tool shank. This rotational asymmetry can effectively prevent the tool head from twisting relative to the tool shank.

According to one embodiment, the tool shank has a groove or notch which runs around the circumference of the tool shank and in which the layer of material engages. For example, the groove or notch runs completely or only partially around the tool shank. This groove or notch can effectively prevent the tool head from being removed or detached axially from the tool shank.

According to one embodiment, the tool shank has an axial bore which forms an opening in the area of the tool head, in particular in a front-side area of the tool head. Due to the axial bore, a fluid can be specifically discharged through the opening in the area in which the material is processed, e.g. for the purpose of cooling.

According to a further aspect, a method is disclosed for producing a tool with a diamond-studded tool head, in particular for manufacturing a diamond tool according to any of the preceding embodiments. The method comprises the following steps:

providing a tool shank;
fixing a support element to a free end of the tool shank;
applying a layer of material interspersed with diamonds at least in sections to the support element and to a section of the tool shank adjoining the support element;
at least partially, preferably completely, removing the support element, so that the layer of material interspersed with diamonds on the tool shank forms a tool head which has a circular ring-like cross-section and a recess on the front side.

The method has the technical advantage that by using the support element, a tool head can be integrally bonded directly and immediately to the tool shank, so that a mechanically highly resilient diamond tool is created which can be manufactured easily and thus cost-effectively and which also has advantages with regard to concentricity.

According to one embodiment of the method, the support element is a body which is cylindrical at least in sections and is used as a support for growing the layer of material interspersed with diamonds at least in sections. In other words, the support element merely forms a temporary supporting structure for growing the layer of material and is removed again after the layer of material has grown and any post-processing work has been carried out, so that only the layer of material grown on the support element is left.

According to one embodiment, the support element is frictionally connected and/or integrally bonded to the tool shank. Preferably, the connection is carried out without the influence of heat, for example by pressing and/or gluing, in order to avoid negative effects on the properties of the material of the tool shank.

According to one embodiment, the support element has a projection which is inserted, in particular pressed, into a recess in the tool shank to fix the support element to the tool shank. In particular, the recess in the tool shank can be in particular an axial bore through which a fluid can be passed when the diamond tool is used. The frictional connection between the support element and the tool shank, which can additionally be secured, for example, by adhesive bonding, provides a mechanically stable connection between the tool shank and the support element for growing the layer of material.

According to one embodiment, the layer of material interspersed with diamonds at least in sections is applied to the support element and in sections to the tool shank by means of an electroplating process. Thus, the layer of material forms with a first section the integral bond of the tool head to the tool shank and with a second section, which protrudes from the tool shank on the free end-side, a tool section interspersed with diamonds, by means of which the material is processed. This makes it possible to create a one-piece tool head which is integrally bonded to the tool shank and protrudes in sections like a sleeve from the tool shank in order to allow the processing of material with this section.

According to one embodiment, one or more contours are provided at the section of the tool shank that adjoins the support element, said contours being covered by the layer of material interspersed with diamonds at least in sections. The contouring can effectively prevent twisting of the tool head relative to the tool shank and/or axial removal of the tool head from the tool shank.

According to one embodiment, the support element is removed by machining the material on the front side. The support element is preferably removed by drilling or boring on the front side so that only the layer of material applied to the support element is left, i.e. the support element is completely or substantially completely removed. This can reduce the weight of the diamond tool and increase concentricity.

The term "nickel layer interspersed with diamonds" or "nickel-diamond layer" refers to a layer of material which, as the material enclosing or binding the diamonds, predominantly contains nickel, but which may also contain further additives, e.g. additives to achieve a desired degree of hardness of the layer of material, etc.

The expressions "approximately", "substantially" or "about" mean deviations from the respectively exact value by +/−10%, preferably by +/−5% and/or deviations in the form of changes that are insignificant for the function.

BRIEF DESCRIPTION OF THE DRAWINGS

Disclosed embodiments are described in more detail below by means of the drawings, wherein.

DETAILED DESCRIPTION

Developments, advantages and possible uses will be apparent from the following description of embodiments and from the drawings. All features described and/or depicted may be used in isolation or in any combination.

Figure 1:
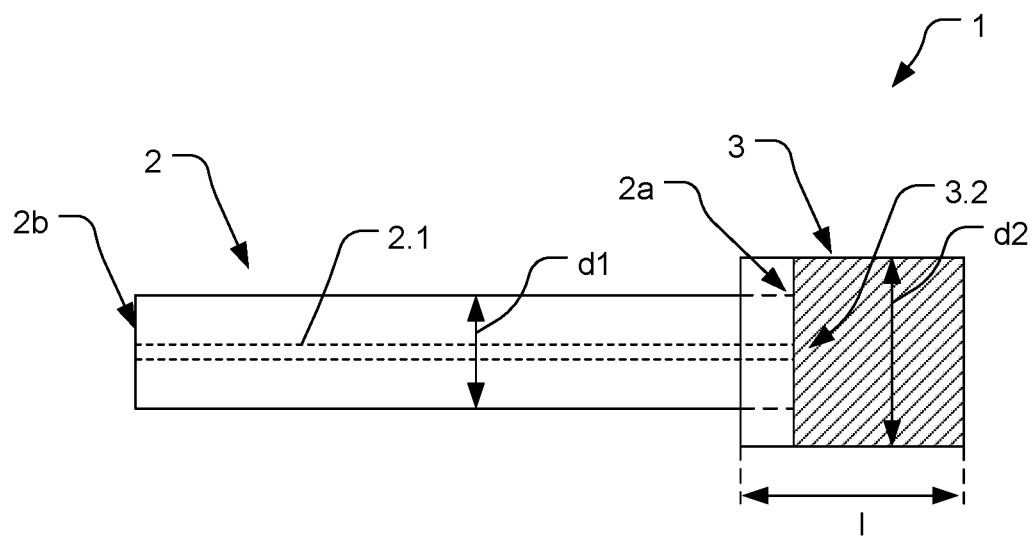
FIG. 1 shows, by way of example and roughly outlined, a lateral illustration of a diamond tool.
Figure 2:
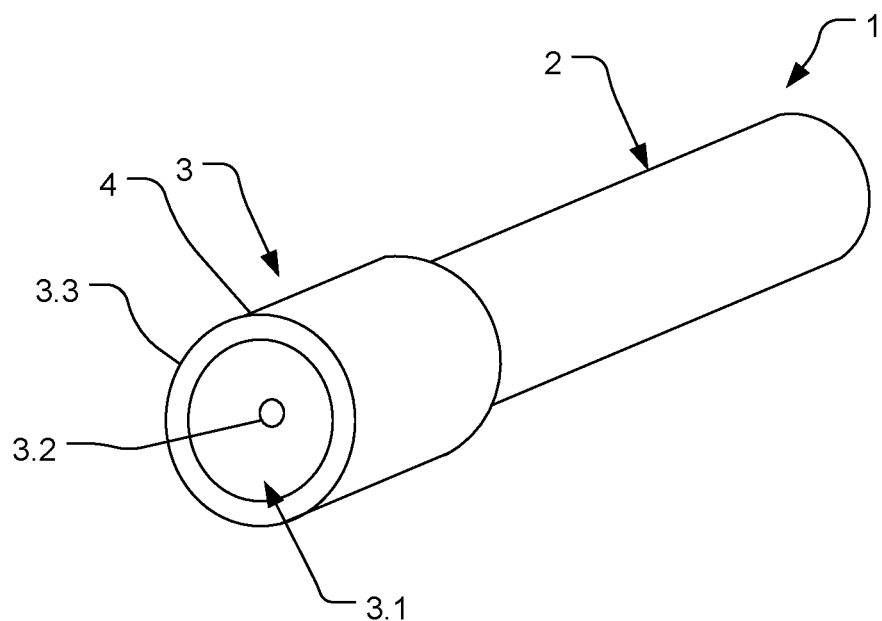
FIG. 2 shows, by way of example and roughly outlined, a diamond tool in a perspective, front view of the tool head.

FIGS. 1 and 2 show, by way of example and roughly outlined, a diamond tool 1. The diamond tool 1 comprises a tool shank 2 and a tool head 3 studded with diamonds. The diamond tool 1 can be in particular a diamond hollow milling cutter, i.e. the tool head 3 has—as can be seen in particular in FIG. 2—a front side recess 3.1, which is delimited on the circumference by a ring-shaped tool head section 3.3.

The tool shank 2 can be made in particular of a cemented carbide, for example of carbide grade K-40UF, or other cemented carbide grades suitable for use in precision and machining tools.

In order to supply a fluid while the workpiece is processed, the tool shank 2 has an axial bore 2.1 that runs along the central longitudinal axis of the tool shank. An opening 3.2 is provided in the area of the recess 3.1, through which the fluid can escape at the front side, e.g. to cool the workpiece surface to be processed.

As shown in particular in FIG. 1, the tool shank 2 can have a smaller diameter d1 than the tool head 3 (diameter d2, d1<d2).

As described in more detail below, the tool head 3 is a tool head which is produced by an electroplating process and which is directly connected to the tool shank 2, i.e. a deposited layer of material 4, in particular metal that is deposited by electroplating, forms the tool head 3 and can be interspersed with diamonds at least in sections, surrounds at least in sections the tool shank 2 and thus leads to a fixed connection between tool shank 2 and tool head 3. The part of the tool head 3 that is interspersed with diamonds is hatched in FIG. 1, and the part of the tool head 3 that establishes the connection with the tool shank 2 is not hatched. It is understood that the part of the tool head 3 that establishes the connection with the tool shank 2 can also be interspersed with diamonds, at least in sections.

The tool head 3 is preferably formed by depositing nickel layers by electroplating and embedding diamonds in these nickel layers. This results in a highly resilient tool head 3 of the diamond tool 1.

Figure 3:
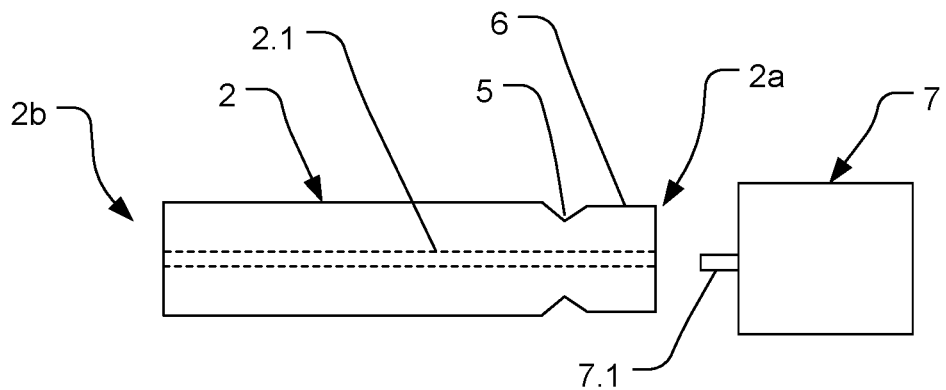
FIG. 3 shows, by way of example and roughly outlined, a lateral view of the tool shank and a support element to be arranged on the tool shank.
Figure 4:
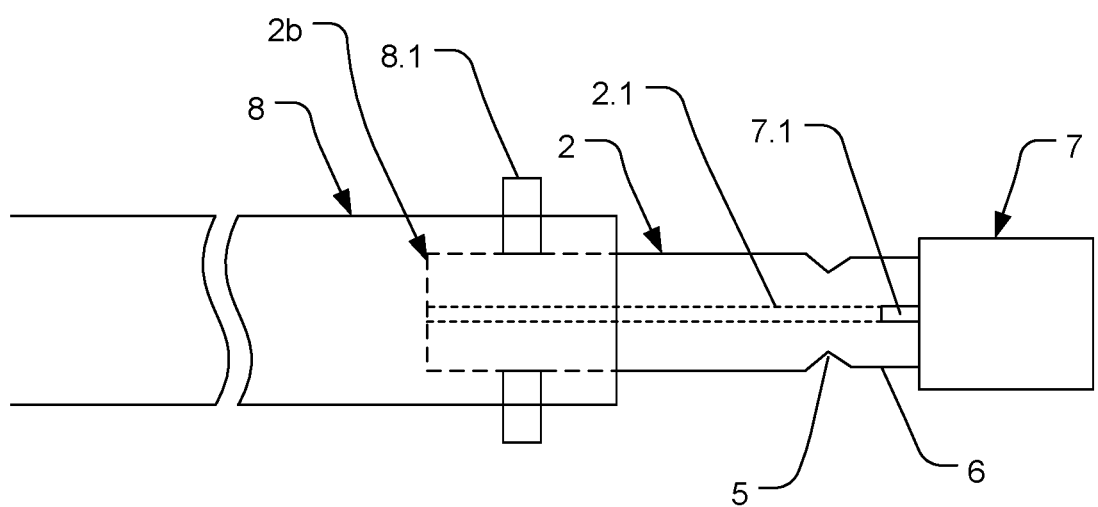
FIG. 4 shows, by way of example and roughly outlined, a lateral view of a tool shank clamped on the free end-side in a holding device and a support element arranged on the tool shank.

In order to be able to form the recess 3.1 on the tool head 3, a support element 7 is used as shown in FIGS. 3 and 4. The support element 7 is preferably used as a support for growing a circumferential section of the tool head 3 by electroplating. The support element 7 is subsequently at least partially removed, leaving, on the front side, only a annular tool head section 3.3 interspersed with diamonds and grown by electroplating.

FIG. 3 shows an exploded view of the tool shank 2 and the support element 7.

The support element 7 is designed to be connected on the front side to a free end 2a of tool shank 2. The connection can be frictional and/or an integral bond. In the illustrated embodiment, the support element 7 has a projection 7.1 which can be used to establish a frictional connection to the tool shank 2. For example, the projection 7.1 can be pressed into the free end of the axial bore 2.1 as an interference fit, so that the support element 7 is fixed to the tool shank 2 via the projection 7.1. Alternatively or additionally, an integral bond can be established between the tool shank 2 and the support element 7, e.g. by bonding (especially two-component adhesive).

The support element 7 can be made of any material that can be machined, in particular metal, steel, brass, etc.

In order to be able to fix the tool head 3 produced by electroplating to the tool shank 2 in an improved way, the tool shank 2 has a circumferential contouring in its area adjoining the free end 2a. The circumferential contouring preferably has a rotationally asymmetrical area 6, in which the tool shank 2 has a polygonal cross-section, for example. The polygonal cross-section can have e.g. a polygonal shape, such as a hexagonal shape. The rotationally asymmetrical area 6 can effectively prevent twisting of the tool head 3 with respect to the tool shank 2.

In addition, the circumferential contouring can include a groove 5. With regard to the free end 2a of tool shank 2, this groove can adjoin the rotationally asymmetrical area 6 or alternatively come to lie in front of the rotationally asymmetrical area 6. The groove 5 can be provided on the circumferential side only in partial areas or run completely around the tool shank 2. The groove 5 can prevent unwanted axial removal or detachment of the tool head 3 from the tool shank 2.

FIG. 4 shows the support element 7 which is arranged on the tool shank 2 and which is inserted with the free end 2b into a holding device 8 for the electroplating of the nickel-diamond layer of the tool head 3. The fixation can be a clamping fixation, e.g. by means of screws 8.1 which are advanced radially to the tool shank 2.

A method for producing a diamond tool 1 is described in more detail below.

First, a tool shank 2 is provided, preferably with the aforementioned circumferential contouring in the form of the groove 5 and/or the rotationally asymmetrical area 6. In addition, a support element 7 is provided, which is connected to the tool shank 2 via an integral bond and/or a frictional connection. The length 1 of the support element 7, protruding from the free end of tool shank 2, is e.g. the subsequent drilling or milling depth of the diamond tool 1.

After fixing the support element 7 to the tool shank 2, the support element 7 can be subsequently processed on the circumference side, e.g. by turning to a desired outside diameter. This outer diameter of the support element 7 preferably determines the inner diameter of the finished diamond tool 1 in the area of the recess 3.1 of the tool head 3.

Preferably, a centering can be applied to the front side of the support element 7 facing away from the tool shank 2, by means of which the tool head 3 can be aligned in a later method step and can be circularly ground on the outside.

The tool shank 2 with the support element 7 provided thereon can then be applied to the holding device 8 and fixed therein by means of the free end 2b (see FIG. 4) in order to subsequently carry out the electroplating process.

Figure 5:
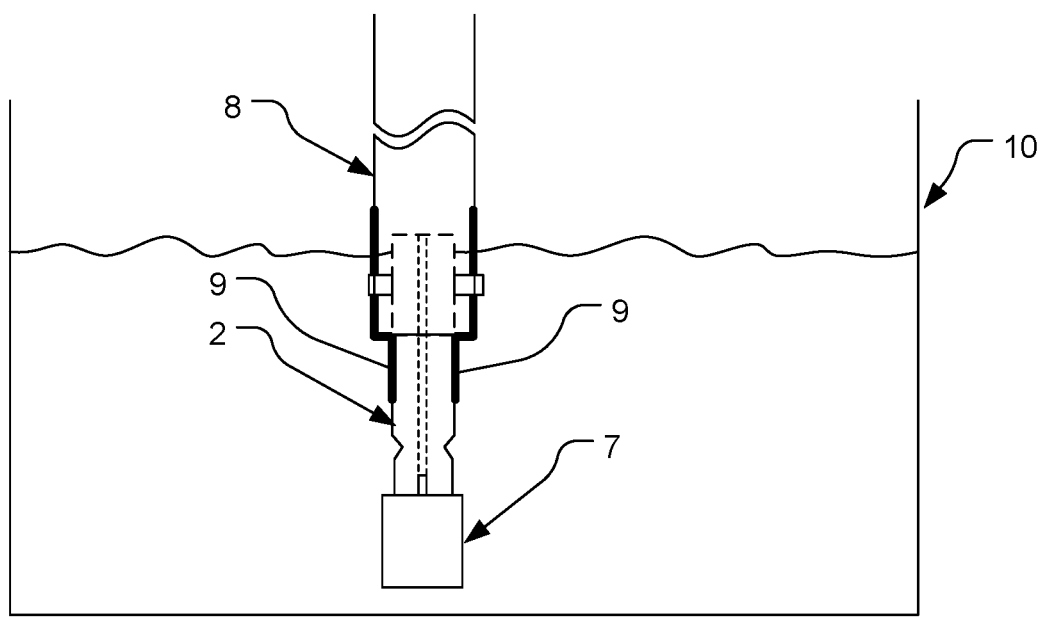
FIG. 5 shows, by way of example and roughly outlined, an electroplating basin for the electroplating of the support element and tool shank with a layer of material interspersed with diamonds in sections.

In order to carry out the electroplating process, it can be advantageous to shield certain areas which shall not be covered by means of the electroplating process. This shielding can be done by means of a cover layer 9, which preferably forms an electrical insulation layer, so that in the areas in which the cover layer 9 is present, no electroplating deposition takes place through the electrolytic electroplating process. As shown in FIG. 5, the cover layer 9 can at least partially cover the holding device 8 and partially cover the tool shank 2. In particular, the cover layer 9 ends in front of the groove 5 or the rotationally asymmetrical area 6 in order to be able to electroplate these peripheral contours and the support element 7 with the layer of material 4 (preferably consisting of nickel).

Preferably, the front side of the support element 7 opposite the tool shank 2 can also have a cover layer 9 in order to facilitate exposure of this front side of the support element 7 after the electroplating process.

Before the electroplating process, e.g. preparation processes can be carried out, in particular cleaning processes, degreasing processes and/or activation processes.

Thereafter, a layer of material interspersed with diamonds, in particular a nickel-diamond layer, is built up by means of an electroplating process.

FIG. 5 shows an example of an assembly for carrying out the electroplating process. A solution containing nickel (preferably with additives that provide the necessary hardness) is provided in a tank 10. The holding device 8 fixing the tool shank 2 together with the support element 7 is immersed in the nickel bath. This process is in particular an electrolytic process in which the ions contained in the solution, in particular metal ions, are directed by an electric field onto the support element 7 to be coated or the adjoining section of tool shank 2.

The electroplating process is carried out until a desired layer thickness is reliably achieved on the support element 7. Preferably, the layer thickness is chosen to be larger, so that, even after a subsequent external cylindrical grinding, the tool head 3 retains the desired layer thickness of the nickel-diamond layer.

After the electroplating process, it is preferable to expose the front side of the support element 7 opposite the tool shank 2. In particular, the nickel-diamond layer is removed from the front side in order to expose the centering provided in the support element 7. This centering is advantageous for the external circular grinding of the tool head 3.

After the tool shank 2 has been removed from the holding device 8 and cleaned, if necessary, a grinding process is carried out in which the tool head 3 is ground to the desired outside diameter. For this purpose, the tool shank 2 is preferably clamped in a clamping device, in particular a precision collet chuck, centered at the opposite end by means of the centering point of a tailstock on the exposed centering of the support element 7 and then circularly ground on the outside.

The support element 7 is then removed at least partially, preferably completely. This is preferably done by machining, such as drilling or turning, so that after removing the support element 7, a recess 3.1 is formed on the front side of the tool head 3 and is circumferentially delimited by a tool head section 3.3 of nickel-diamond material. In other words, in such an embodiment the tool head 3 thus forms a hollow milling cutter in which the wall which is made as a circular ring and forms the hollow milling cutter (tool head section 3.3) consists only of the electroplated nickel-diamond material.

In addition, the axial bore 2.1 can be opened on the front side, provided that it is still closed by the projection 7.1 of the support element 7.

The nickel layer can then be turned off in the area behind the groove 5, i.e. in the area facing away from the tool head 3 behind the circumferential contouring.

Finally, dressing and leveling of the tool head 3, internal sharpening of the diamonds on the exposed inner side of the front-side wall formed as a circular ring, etc., as well as testing and checking of the diamond tool (e.g. with regard to concentricity, hardness of the nickel-diamond layer, oscillation frequency, etc.) can be carried out.

It is understood that numerous amendments and modifications are possible without leaving the scope of protection defined by the claims.

While illustrative embodiments have been illustrated and described, it will be appreciated that various changes can be made therein without departing from the spirit and scope of the invention.

LIST OF REFERENCE SIGNS 1 diamond tool
2 tool shank
2a free end
2b free end
2.1 axial bore
3 tool head
3.1 recess
3.2 opening
3.3 tool head section
4 layer of material
5 groove
6 rotationally asymmetrical area
7 support element
7.1 projection
8 holding device
8.1 screws
9 cover layer
10 tank
d1 diameter of the tool shank
d2 diameter of the tool head
1 length

The invention claimed is:

1. A method for producing a tool with a diamond-studded tool head, comprising the following steps:
providing a tool shank;
fixing a support element to a free end of the tool shank;
applying a layer of material interspersed with diamonds at least in sections to the support element and to a section of the tool shank adjoining the support element;
at least partially removing the support element, so that the layer of material interspersed with diamonds forms a tool head which in cross-section has the form of a circular ring and has a front-side recess.

2. The method according to claim 1, wherein the support element is a body which is cylindrical in shape at least in sections and which is used as a support for growing the layer of material interspersed with diamonds at least in sections.

3. The method according to claim 1, wherein the support element is fixed to the tool shank in frictional connection and/or by an integral bond.

4. The method according to claim 1, wherein the support element has a projection that is inserted into a recess of the tool shank to the support element to the tool shank.

5. The method according to claim 1, wherein the layer of material is applied by means of an electroplating process to the support element and in sections to the tool shank.

6. The method according to claim 1, wherein one or more contours, which are covered by the layer of material, are provided on the section of the tool shank that adjoins the support element.

7. The method according to claim 1, wherein the support element is completely removed during the step of at least partially removing the support element.

* * * * *